(12) United States Patent
Ambrus et al.

(10) Patent No.: US 10,802,278 B2
(45) Date of Patent: Oct. 13, 2020

(54) SPACE CARVING BASED ON HUMAN PHYSICAL DATA

(71) Applicant: Microsoft Technology Licensing, LLC, Redmond, WA (US)

(72) Inventors: Anthony J. Ambrus, Seattle, WA (US); Jea Gon Park, Ann Arbor, MI (US); Adam G. Poulos, Redmond, WA (US); Justin Avram Clark, Kirkland, WA (US); Michael Jason Gourlay, Seattle, WA (US); Brian J. Mount, Seattle, WA (US); Daniel J. McCulloch, Kirkland, WA (US); Arthur C. Tomlin, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 16/243,814

(22) Filed: Jan. 9, 2019

(65) Prior Publication Data
US 2019/0162964 A1 May 30, 2019

Related U.S. Application Data

(63) Continuation of application No. 13/931,507, filed on Jun. 28, 2013, now Pat. No. 10,330,931.

(51) Int. Cl.
*G06T 19/00* (2011.01)
*G02B 27/01* (2006.01)

(52) U.S. Cl.
CPC ............ *G02B 27/017* (2013.01); *G06T 19/00* (2013.01); *G06T 19/003* (2013.01); *G02B 2027/014* (2013.01); *G02B 2027/0134* (2013.01); *G02B 2027/0178* (2013.01); *G06T 2215/16* (2013.01)

(58) Field of Classification Search
CPC ...... G02B 27/017; G06T 19/00; G06T 19/003
USPC .......................................................... 345/419
See application file for complete search history.

(56) References Cited

U.S. PATENT DOCUMENTS

| 2012/0154557 | A1* | 6/2012 | Perez | H04N 21/25891 |
| | | | | 348/53 |
| 2012/0194516 | A1* | 8/2012 | Newcombe | G06T 17/00 |
| | | | | 345/420 |

OTHER PUBLICATIONS

D. F. Fouhey, V. Delaitre, A. Gupta, A. A. Efros, I. Laptev, and J. Sivic. People watching: Human actions as a cue for single-view geometry. In ECCV, 2012.*

(Continued)

*Primary Examiner* — Jin Ge
(74) *Attorney, Agent, or Firm* — Arent Fox LLP

(57) ABSTRACT

Technology is described for (3D) space carving of a user environment based on movement through the user environment of one or more users wearing a near-eye display (NED) system. One or more sensors of the NED system provide sensor data from which a distance and direction of movement can be determined. Spatial dimensions for a navigable path can be represented based on user height data and user width data of the one or more users who have traversed the path. Space carving data identifying carved out space can be stored in a 3D space carving model of the user environment. The navigable paths can also be related to position data in another kind of 3D mapping like a 3D surface reconstruction mesh model of the user environment generated from depth images.

17 Claims, 13 Drawing Sheets

(56) References Cited

OTHER PUBLICATIONS

"Tracking Multiple Occluding People by Localizing on Multiple Scene Planes," IEEE Trans. Pattern Analysis and Machine Intelligence, vol. 31, No. 3, pp. 505-519, Mar. 2009).*

* cited by examiner

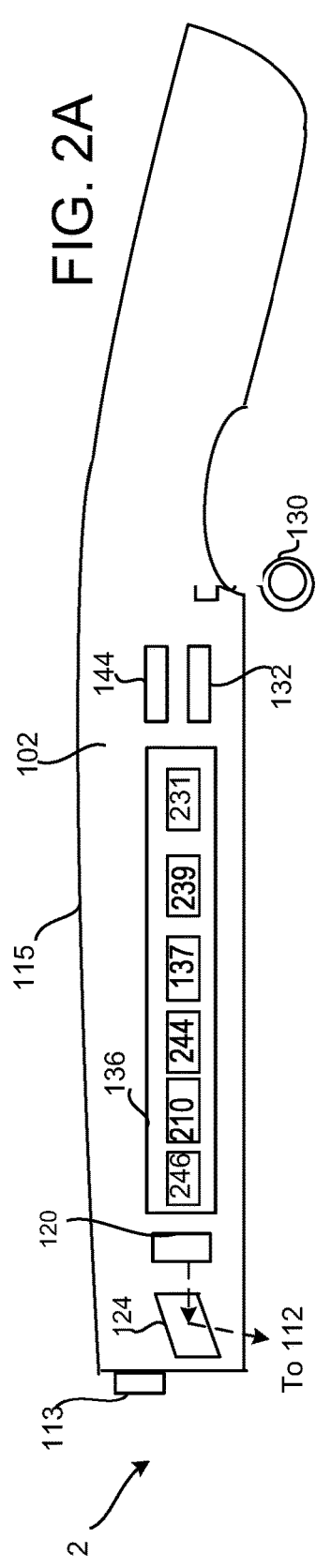
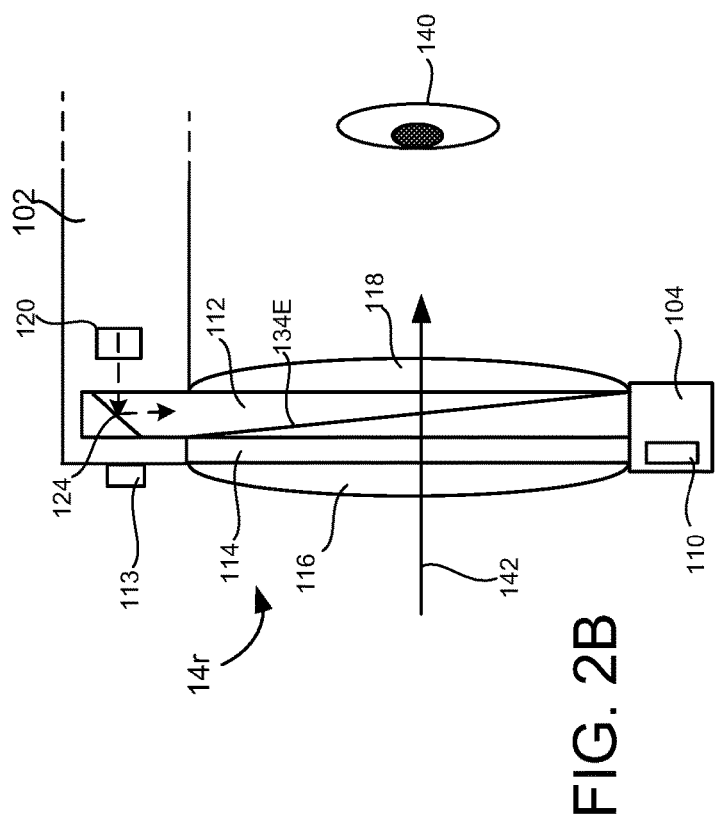

SPACE CARVING BASED ON HUMAN PHYSICAL DATA

CROSS-REFERENCE TO RELATED APPLICATION(S)

This application claims the benefit of U.S. Non-Provisional application Ser. No. 13/931,507, entitled "SPACE CARVING BASED ON HUMAN PHYSICAL DATA" and filed on Jun. 28, 2013, which is expressly incorporated by reference herein in its entirety.

BACKGROUND

A near-eye display (NED) device, such as a head mounted display (HMD) device, may be worn by a user for an augmented reality (AR) experience, mixed reality or a virtual reality (VR) experience. For playing games or other activities in which a user or virtual objects move around a user environment, a three-dimensional (3D), detailed mapping of the environment identifying the shapes and positions of real objects in a location can be used to identify where virtual objects can be placed and moved as if they were real. For example, a real object does not run through the couch, and a user seeing a virtual object do so receives a distracting unrealistic depth cue interrupting the AR or VR experience. A detailed mapping like a very dense 3D surface mesh representation of a space allows for realistic experiences but is computationally expensive, particularly for computer resources available in a near-eye display (NED) system.

SUMMARY

The technology provides one or more embodiments for space carving a user environment based on movement through the user environment of one or more users wearing a near-eye display (NED) system. Additionally, in some embodiments, human space carving data may be used to decrease processing for more advanced mapping techniques.

The technology provides one or more embodiments of a method for three dimensional (3D) space carving of a user environment based on movement through the user environment of one or more users wearing a near-eye display (NED) system. An embodiment of the method comprises identifying by one or more processors one or more navigable paths in a user environment based on user physical features including a user height and user body width, and sensor data from one or more sensors on the near-eye display (NED) system. Overlapping portions of the one or more navigable paths traversed by the one or more users are merged, and position and spatial dimensions for the one or more navigable paths are stored as carved out space in human space carving data in a 3D space carving model of the user environment.

The technology provides one or more embodiments of a near-eye display (NED) system. An embodiment of a NED system comprises a near-eye support structure, and a near-eye display (NED) supported by the near-eye support structure and having a field of view approximating a user field of view. One or more processors are also communicatively coupled to one or more sensors supported by the near-eye support structure, and the one or more processors determine a distance and a direction of movement of a user wearing the NED system based on time stamped sensor data from the one or more sensors. The one or more processors identify one or more navigable paths traversed by the user based on the determined distance and direction. The one or more processors store in an accessible memory space carving data representing the identified one or more navigable paths in a 3D space carving model of the user environment.

The technology provides one or more embodiments of one or more processor readable storage devices comprising instructions which cause one or more processors to execute a method for three dimensional (3D) space carving of a user environment based on movement through the user environment of one or more users wearing a near-eye display (NED) system. An embodiment of the method comprises identifying by one or more processors one or more navigable paths traversed by one or more users wearing the NED system in a user environment based on user physical features including user height and user body width and sensor data from one or more sensors on the near-eye display (NED) system. Overlapping portions of the one or more navigable paths traversed by the one or more users are merged, and position and spatial dimensions for the one or more navigable paths are stored as carved out space in human space carving data in a 3D space carving model of the user environment. A visual representation of the state of space carving in the user environment by the NED is displayed as feedback to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a side view of an eyeglass temple of a frame in an embodiment of the NED device having an optical see-through AR display, and the NED device being embodied as eyeglasses providing support for hardware and software components.

FIG. 2B is a top view of an embodiment of a display optical system of the embodiment of the NED device.

DETAILED DESCRIPTION

The technology provides one or more embodiments using space carving of a user environment based on movement through the user environment of one or more users wearing a near-eye display (NED) system. Based on time stamped sensor data from one or more sensors on the NED system, a distance and direction of movement of a user wearing the NED system can be determined, and one or more navigable paths traversed by the user can be identified based on the determined distance and direction movement tracked over time. Human physical data such as height and width of one or more users who have traversed a path can be used for representing spatial dimensions of a path. Some examples of sensor data are motion tracking sensors like accelerometer data, magnetometer data, and gyroscope data in three axes. Global Positioning System (GPS) data can be used in some embodiments. Image data from an image sensor may be used as well for position tracking although computations will take longer than motion tracking sensors.

Human space carving data for a 3D mapping is determined with less computational complexity and has higher reliability in identifying navigable paths than 3D surface reconstruction based on depth data in that a human actually traversed the carved out path. For example, glass or mirrored walls or floors are problematic in 3D surface reconstruction. In a shopping mall for instance, infrared (IR) emission from a depth camera identifies merchandise in a window but not the glass in front of the merchandise. However, space carved data indicates there is no path through the window. Additionally, space which has been carved out by one or more users over time can be represented in a space carving model.

In the human space carving case, the initial assumption is that the world is full of matter, and wherever the human goes, the assumption is violated and space representative of the user's height and width is carved out. In contrast, 3D surface reconstruction does not make any particular assumption about the world like whether it's full or whether it's empty. Spacing and object location is based on detecting objects via depth data. For space carving, there is a transition from the "matter" to empty space, and for 3D surface reconstruction there is the transition indicated by an object boundary. The transitions from space carving can be related to the transitions of 3D surface reconstruction. Space carving data can clarify confidence values of depth measurements, and help build up the 3D surface reconstruction, e.g. a mesh reconstruction, more quickly. In some embodiments, one or more applications for space carving provide incentives for a user to assist with carving out space.

Figure 1:
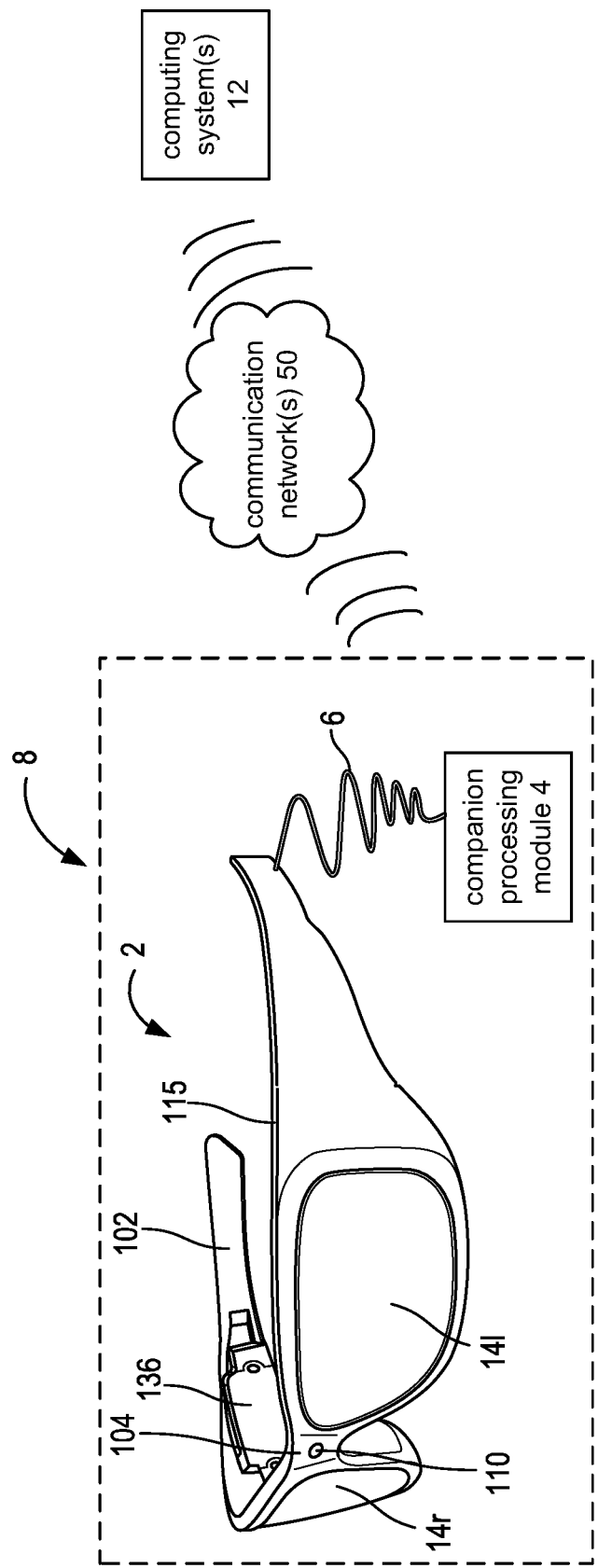
FIG. 1 is a block diagram depicting example components of one embodiment of a near-eye display (NED) system.

FIG. 1 is a block diagram depicting example components of one embodiment of a near-eye display (NED) system. In the illustrated embodiment, the system 8 includes a near-eye display (NED) device as a head mounted display (HMD) device 2 and communicatively coupled via a wire 6 to another computer system identified as a companion processing module 4. In other embodiments, wireless communication between the NED device 2 and the companion processing module 4 may be used. In other embodiments, the functionality of the companion processing module 4 may be integrated in software and hardware components of the display device 2.

In these embodiments, NED device 2 is in the shape of eyeglasses in a frame 115, with a respective display optical system 14*l*, 14*r* is positioned at the front of the NED device to be seen through by each eye when the NED is worn by a user. In this embodiment, each display optical system 14*l*, 14*r* uses a projection display in which image data is projected into a user's eye to generate a display of the image data so that the image data appears to the user at a location in a three dimensional field of view in front of the user. Each display optical system 14*l*, 14*r* is also referred to as a display, and the two display optical systems together may also be referred to as a display.

In these embodiments, frame 115 provides a convenient eyeglass frame as a near-eye support structure for holding elements of the NED device 2 in place as well as a conduit for electrical connections. The frame 115 includes a nose bridge 104 with a microphone 110 for recording sounds and transmitting audio data to control circuitry 136. A temple or side arm 102 of the frame rests on each of a user's ears, and in this example, a right side arm 102 is illustrated as including control circuitry 136 for the NED device 2.

In some embodiments, companion processing module 4 is a portable computer system like a mobile device (e.g. smartphone, tablet, laptop, etc.). One or both of the NED device and the companion processing module 4 may communicate over one or more communication networks 50 to one or more network accessible computer systems 12, whether located nearby or at a remote location.

An application may be executing on a computer system 12 which interacts with or performs processing for an application executing on one or more processors in the near-eye display system 8. For example, a 3D mapping application may be executing on the one or more computers systems 12, and the user's near-eye display system 8 communicates image and depth data from image sensors and other sensor data like inertial sensor data which the one or more computer systems 12 use for building a detailed 3D mapping of the user's environment. The NED system 8 can then download the detailed 3D mapping for identifying what a user is looking at and where to display image data representing virtual objects the field of view of the display. The term "display field of view" refers to a field of view of a display of the NED system. In other words, the display field of view approximates a user field of view as seen from a user perspective.

FIG. 2A is a side view of an eyeglass temple 102 of a frame in an embodiment of the NED device having an optical see-through AR display. At the front of frame 115 is depicted one of at least two depth image capture devices 113, e.g. depth cameras, which can capture image data like video and still images, typically in color, of the real world as well as depth sensor data. The depth sensor data may be captured by depth sensitive pixels which correspond to pixels on an image sensor in the depth camera 113. The capture devices 113 are also referred to as outward facing capture devices meaning facing outward from the user's head.

The illustrated capture device is a front facing capture device which is calibrated with respect to a reference point of its respective display optical system 14. One example of such a reference point is an optical axis (see 142 in FIG. 2B) of its respective display optical system 14. The calibration allows the display field of view of the display optical systems 14 to be determined from the depth image data captured by the capture devices 113. The depth data and image data form a depth map of the display field of view. A three dimensional (3D) mapping of a display field of view can be generated based on the depth map, and the 3D mapping is used to identify a user head view direction and where to display image data representing virtual objects for the user wearing the NED device 2 to see.

Control circuitry 136 provides various electronics that support the other components of head mounted display device 2. In this example, the right side arm 102 illustrates exemplary components of control circuitry 136 for the display device 2. The exemplary components include a display driver 246 for an image generation unit 120. For example, the display driver 246 may provide control signals to microdisplay circuitry and drive current to an illumination source for the microdisplay. Other exemplary components includes a processing unit 210 which controls the display driver 246, a memory 244 accessible to the processing unit 210 for storing processor readable instructions and data, a communication module 137 communicatively coupled to the processing unit 210, sensor/speaker interface circuitry 231, and a power supply 239 providing power for the components of the control circuitry 136 and the other components of the display device 2 like the capture devices 113, the microphone 110 and the sensor units discussed below. The interface circuitry 231 performs analog to digital conversion, if necessary, for sensor readings such as from the inertial sensing unit 132 and the location sensing unit 144, and performs digital to analog conversion for audio output to the earphones 130. The interface circuitry 231 may also buffer sensor readings directly into memory 244 or transfer the sensor readings to processing unit 210.

The processing unit 210 may comprise one or more processors including a central processing unit (CPU) and a graphics processing unit (GPU), particularly in embodiments without a separate companion processing module 4 which contains at least one graphics processing unit (GPU).

Inside, or mounted to the side arm 102, are an earphone of a set of earphones 130 as an example of an audio output device, an inertial sensing unit 132 including one or more inertial sensors, and a location sensing unit 144 including one or more location or proximity sensors, some examples of which are a GPS transceiver, an infrared (IR) transceiver, or a radio frequency transceiver for processing RFID data. In one embodiment, inertial sensing unit 132 includes a three axis magnetometer, a three axis gyroscope, and a three axis accelerometer as inertial sensors. The inertial sensing unit 132 senses position, orientation, velocity and acceleration of NED device 2. From these sensed movements, head position, (also referred to as head orientation) and thus, orientation of the display device, may also be determined. A change in head position indicates a change in the display field of view, and image data can be updated accordingly.

In this embodiment, the image generation unit 120 can display a virtual object to appear at a designated depth location in a display field of view to provide a realistic, in-focus three dimensional display of a virtual object which can interact with one or more real objects. In some examples, rapid display of multiple images or a composite image of the in-focus portions of the images of virtual features may be used for causing the displayed virtual data to appear in different focal regions. In other examples, Z buffering may be used.

In the illustrated embodiment of FIG. 2A, the image generation unit 120 includes a microdisplay and coupling optics, like a lens system. In this example, image data output by the microdisplay is directed to a reflecting surface 124. The reflecting surface 124 optically couples the light from the image generation unit 120 into a display unit 112 (see FIG. 2B), which directs the light representing the image into a user's eye when the device 2 is worn by a user.

FIG. 2B is a top view of an embodiment of a display optical system of the embodiment of the NED device. In order to show the components of the display optical system 14, in this case 14r for the right eye, a portion of the frame 115 surrounding the display optical system is not depicted. In this embodiment, the displays 14l and 14r are optical see-through displays, and each display includes a display unit 112 illustrated between two optional protective see-through lenses 116 and 118. A representative reflecting element 134E is shown in the display unit and represents the one or more optical elements like a half mirror, gratings, waveguide and other optical elements which may be used for directing light from the image generation unit 120 towards a user eye area 140 while also allowing light from the real world to pass through to the user eye area 140 such as illustrated along arrow 142 which represents an optical axis of the display optical system 14r. An example of a display unit 112 for an optical see-through NED includes a light guide optical element. An example of a light guide optical element is a planar waveguide.

In this embodiment, the NED display 14r is an optical see-through, augmented reality display so that it may allow light from in front of the near-eye display (NED) device 2 to be received by a user eye, thereby allowing the user to have an actual direct view of the space in front of NED device 2 in addition to seeing an image of a virtual object from the image generation unit 120. However, the technology works with video-see displays as well.

Again, FIGS. 2A and 2B show half of the head mounted display device 2. For the illustrated embodiment, a full head mounted display device 2 may include another display optical system 14 as well as another image generation unit 120, another of outward facing capture devices 113, and another of the earphones 130.

Figure 3:
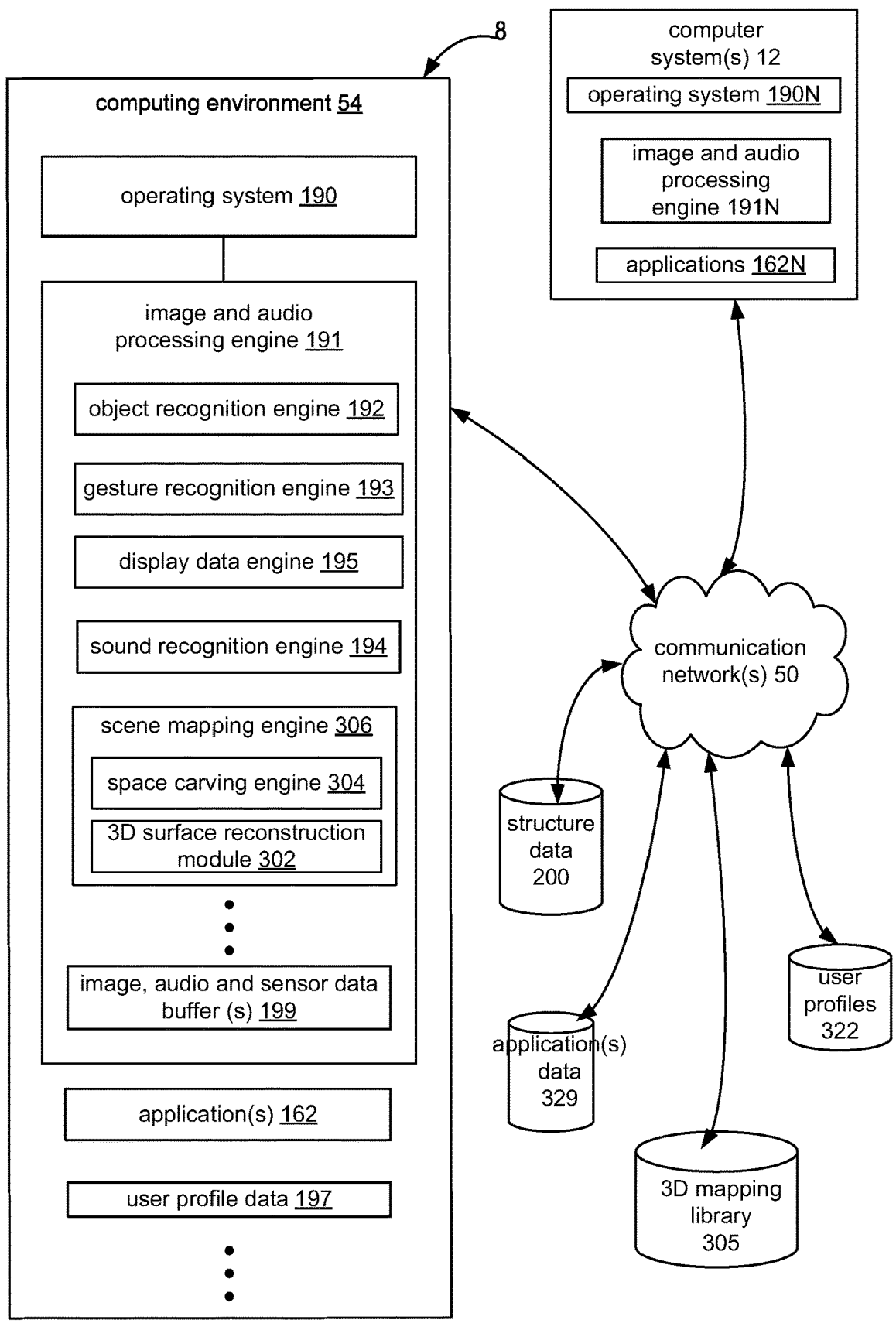
FIG. 3 is a block diagram of an embodiment of a system from a software perspective for 3D mapping of a user environment based on movement through the user environment of one or more users wearing a near-eye display (NED) system.

FIG. 3 is a block diagram of an embodiment of a system from a software perspective for 3D mapping of a user environment based on movement through the user environment of one or more users wearing a near-eye display (NED) system. FIG. 3 illustrates an embodiment of a computing environment 54 from a software perspective which may be implemented by a system like NED system 8, one or more remote computer systems 12 in communication with one or more NED systems or a combination of these. Additionally, a NED system can communicate with other NED systems for sharing data and processing resources.

In this embodiment, an application 162 may be executing on one or more processors of the NED system 8 and communicating with an operating system 190 and an image and audio processing engine 191. In the illustrated embodiment, a remote computer system 12 may also be executing a version 162N of the application as well as other NED systems 8 with which it is in communication for enhancing the experience.

Application data 329 for one or more applications may also be stored in one or more network accessible locations. Some examples of application data 329 may be one or more rule datastores for rules linking action responses to user input data, rules for determining which image data to display responsive to user input data, reference data for natural user input like for one or more gestures associated with the application which may be registered with a gesture recognition engine 193, execution criteria for the one or more gestures, voice user input commands which may be registered with a sound recognition engine 194, physics models for virtual objects associated with the application which may be registered with an optional physics engine (not shown) of the image and audio processing engine 191, and object properties like color, shape, facial features, clothing, etc. of the virtual objects and virtual imagery in a scene.

As shown in the embodiment of FIG. 3, the software components of a computing environment 54 comprise the image and audio processing engine 191 in communication with an operating system 190. The illustrated embodiment of an image and audio processing engine 191 includes an object recognition engine 192, gesture recognition engine 193, display data engine 195, a sound recognition engine 194, and a scene mapping engine 306 including a space carving engine 304 and a 3D surface reconstruction module 302. Additional functionality may be added as indicated by . . . . The individual engines and data stores provide a supporting platform of data and tasks which an application 162 can leverage for implementing its one or more functions by sending requests identifying data for processing and receiving notification of data updates. The operating system 190 facilitates communication between the various engines and applications. The operating system 190 makes available to an application which objects have been identified by the object recognition engine 192, gestures the gesture recognition engine 193 has identified, which words or sounds the sound recognition engine 194 has identified, and the positions of objects, real and virtual from the scene mapping engine 306.

The computing environment 54 also stores data in image, audio and sensor data buffer(s) 199 which provide memory for image data, and audio data which may be captured or received from various sources as well as memory space for image data to be displayed and audio data to be output. The buffers also provide memory for buffering sensor readings such as from sensors like a 3 axis accelerometer, a 3 axis gyroscope and a 3 axis magnetometer as may be embodied in inertial sensing unit 132. The buffers may exist on both the NED, e.g. as part of the overall memory 244, and may also exist on the companion processing module 4.

In many applications, virtual data is to be displayed in relation to a real object in the real environment. The object recognition engine 192 of the image and audio processing engine 191 detects and identifies real objects, their orientation, and their position in a display field of view based on captured image data and captured depth data from outward facing image capture devices 113 if available or determined depth positions from stereopsis based on the image data of the real environment captured by the capture devices 113. The object recognition engine 192 distinguishes real objects from each other by marking object boundaries, for example using edge detection, and comparing the object boundaries with structure data 200. Besides identifying the type of object, an orientation of an identified object may be detected based on the comparison with stored structure data 200. Accessible over one or more communication networks 50, structure data 200 may store structural information such as structural patterns for comparison and image data as references for pattern recognition. Reference image data and structural patterns may also be available in user profile data 197 stored locally or accessible in cloud based storage 322.

The scene mapping engine 306 tracks the three dimensional (3D) position, orientation, and movement of real and virtual objects in a 3D mapping of the display field of view where image data is to be displayed or in a 3D mapping of a volumetric space about the user based on communications with the object recognition engine 192 and one or more executing applications causing image data to be displayed like an application 162. The scene mapping engine 306 in this embodiment includes a space carving engine 304 and a 3D surface reconstruction module 302 which can be update based on the human space carving data. A space carving engine 304, based on data and rules, stored in a network (or local) accessible 3D mapping library 305, determines a 3D space carving model of the user environment which may be stored in the library 305 for further updating by the user or others later. The space carving engine 304 executing on one or more processors of the NED system 8, the network accessible computer system 12, or both may perform the method embodiments discussed below based on data and rules stored in its accessible library 305.

In some embodiments, a 3D surface reconstruction module 302 operating on a network accessible computer system 12 may be performing the computations for a dense 3D surface mesh mapping of the user environment and storing the mapping in the 3D mapping library 305 for the module 302 on the NED system 8 to retrieve. Various levels of detailed mappings may be generated and stored by a local or remotely executing scene mapping engine 306.

A depth map representing captured image data and depth data from outward facing capture devices 113 can be used as a 3D mapping of a display field of view of a near-eye display. The depth map has a view dependent coordinate system for the display field of view approximating a user perspective. The captured data may be time tracked based on capture time for tracking motion of real objects. Virtual object positions can be registered in the depth map.

Mapping what is around the user in the user's environment can be aided with sensor data. Data from an inertial sensing unit 132, e.g. a three axis accelerometer, three-axis gyroscope and a three axis magnetometer, can identify position changes of the user's head and correlation of those head position changes with changes in the image and depth data from the outward facing capture devices 113. Positions of objects relative to one another and at what subset of an environment or location a user is looking are determined.

The scene mapping engine 306 can also use a view independent coordinate system for 3D mapping, and a copy of a scene mapping engine 306 may be in communication with other scene mapping engines 306 executing in other systems (e.g. 12, 20 and 8) so the mapping processing can be shared or controlled centrally by one computer system which shares the updated map with the other systems. Overlapping subject matter in the depth images taken from multiple perspectives may be correlated based on a view independent coordinate system and time, and the image content combined for creating the volumetric or 3D mapping (e.g. an x, y, z representation or a 3D mesh surface reconstruction model) of a location or environment (e.g. a room, a store space, or a geofenced area). Thus, changes in light, shadow and object positions can be tracked. The view independent map can be stored in a network accessible location accessible via a remote computer system 12.

An application like a user space application 162 identifies a target 3D space position in the 3D mapping of the display field of view for an object represented by image data and controlled by the application. The display data engine 195 performs translation, rotation, and scaling operations for display of the image data at the correct size and perspective. The display data engine 195 relates the target 3D space position in the display field of view to display coordinates of the display unit 112. For example, the display data engine may store image data for each separately addressable display location or area, e.g. a pixel, in a Z-buffer and a separate color buffer. The display driver 246 translates the image data for each display area to digital control data instructions for controlling the image generation unit 120.

The technology may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats.

For illustrative purposes, the method embodiments below are described in the context of the system and apparatus embodiments described above. Examples of the one or more processors referenced below are one or more processors of the NED system 8 (with or without the companion processing module 4) or one or more remote computer systems 12 or both. However, the method embodiments are not limited to operating in the system embodiments described above and may be implemented in other system embodiments. Furthermore, the method embodiments may be continuously performed while the NED system is in operation and an applicable application is executing.

Figure 4:
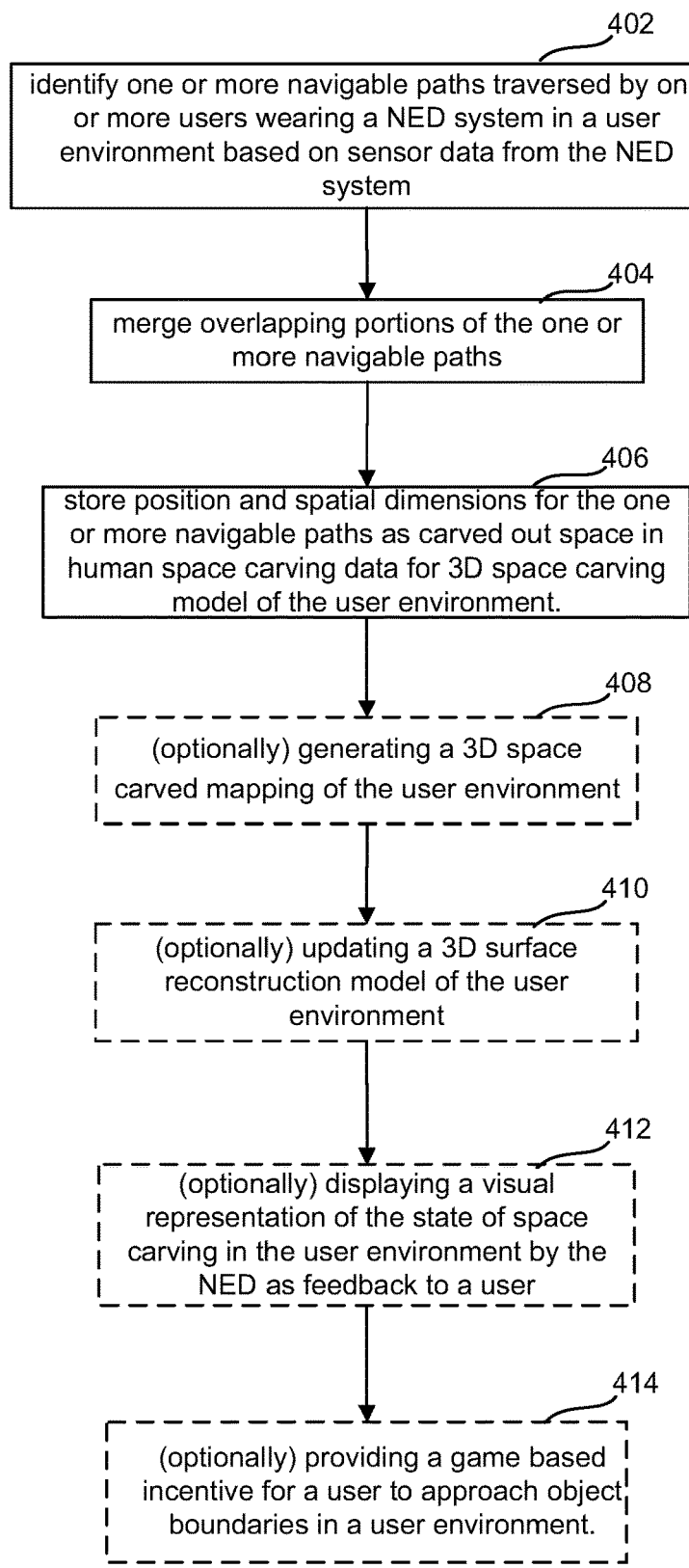
FIG. 4 is a flowchart of an embodiment of a method for three dimensional (3D) space carving of a user environment based on movement through the user environment of one or more users wearing a near-eye display (NED) system.
Figure 11:
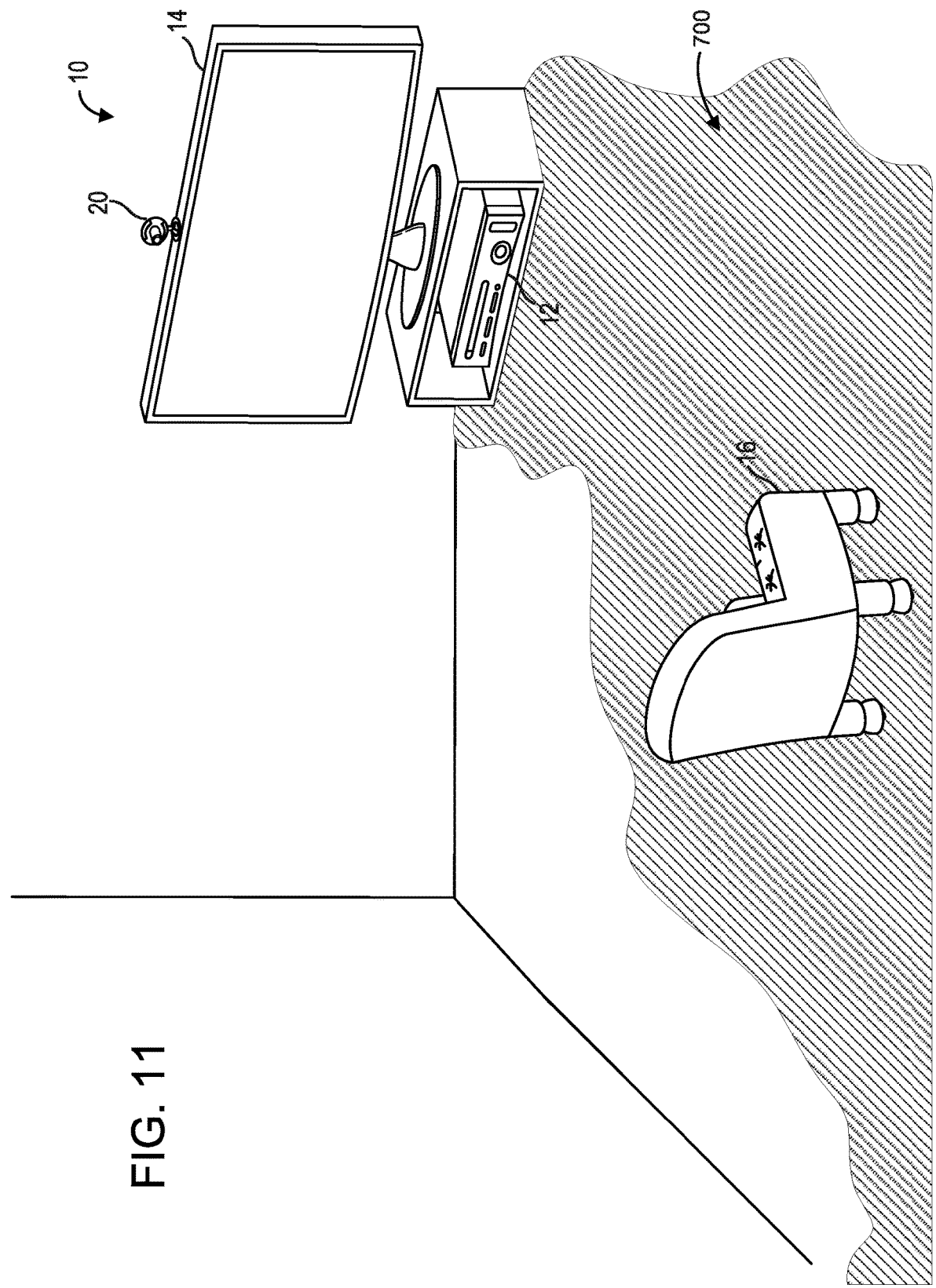
FIG. 11 illustrates an example of a user view of a state of space carving represented by a carved out space overlay being displayed by the NED system as feedback to the user on carving progress.

FIG. 4 is a flowchart of an embodiment of a method for three dimensional (3D) space carving of a user environment based on movement through the user environment of one or more users wearing a near-eye display (NED) system. In step 402, one or more navigable paths are identified by one or more processors in a user environment based on sensor data from one or more sensors on the near-eye display (NED) system. The sensor data is time stamped, and the one or more processors can track distance and a direction of movement of the user over time based on the time stamped sensor data. In some embodiments, user physical features such as user height data and user width data can be used for representing spatial dimensions of a path a user is traversing. An example of a navigable path identified based on user features is volume 645 of FIG. 7B representing a space user 29 has walked through as determined from sensor data including inertial sensing unit data from inertial sensing unit 132. In step 404, overlapping portions of the one or more navigable paths traversed by one or more users are merged, and in step 406, position and spatial dimensions are stored for the one or more navigable paths as carved out space in human space carving data for a 3D space carving model of the user environment. FIG. 11 illustrates an example of carved out space 700 in a living room. Merging of paths over time has identified a corridor between the chair and the audiovisual system 10.

The amount of mapping available for a location, like the user's living room, may vary. Additionally, for an application, generating a mapping may be more quickly done based on space carving, and may be performed entirely by the NED system in some examples. A 3D mapping based on space carving may provide sufficient resolution for placement and movement of game elements, e.g. game characters, through a space for some applications. Thus in optional step 408, a 3D space carved mapping of the user environment may optionally be generated. An example of a process for generating a 3D space carved mapping is discussed below for FIG. 5.

In other examples, a stored 3D mapping of the user environment may have been retrieved from storage, local or network accessible, and positions of the carved out space from the human space carving data are related to the coordinates of the existing retrieved 3D mapping. The existing mapping may be a space carved mapping but may also be a more detailed mapping such as a 3D surface reconstruction model of the user environment, for example, a mesh version of the user environment showing all the surfaces. In optional step 410, a 3D surface reconstruction model of the user environment may be updated based on the identified carved out space. An example of a process for updating 3D surface reconstruction model is discussed in FIG. 6 below.

Figure 9:
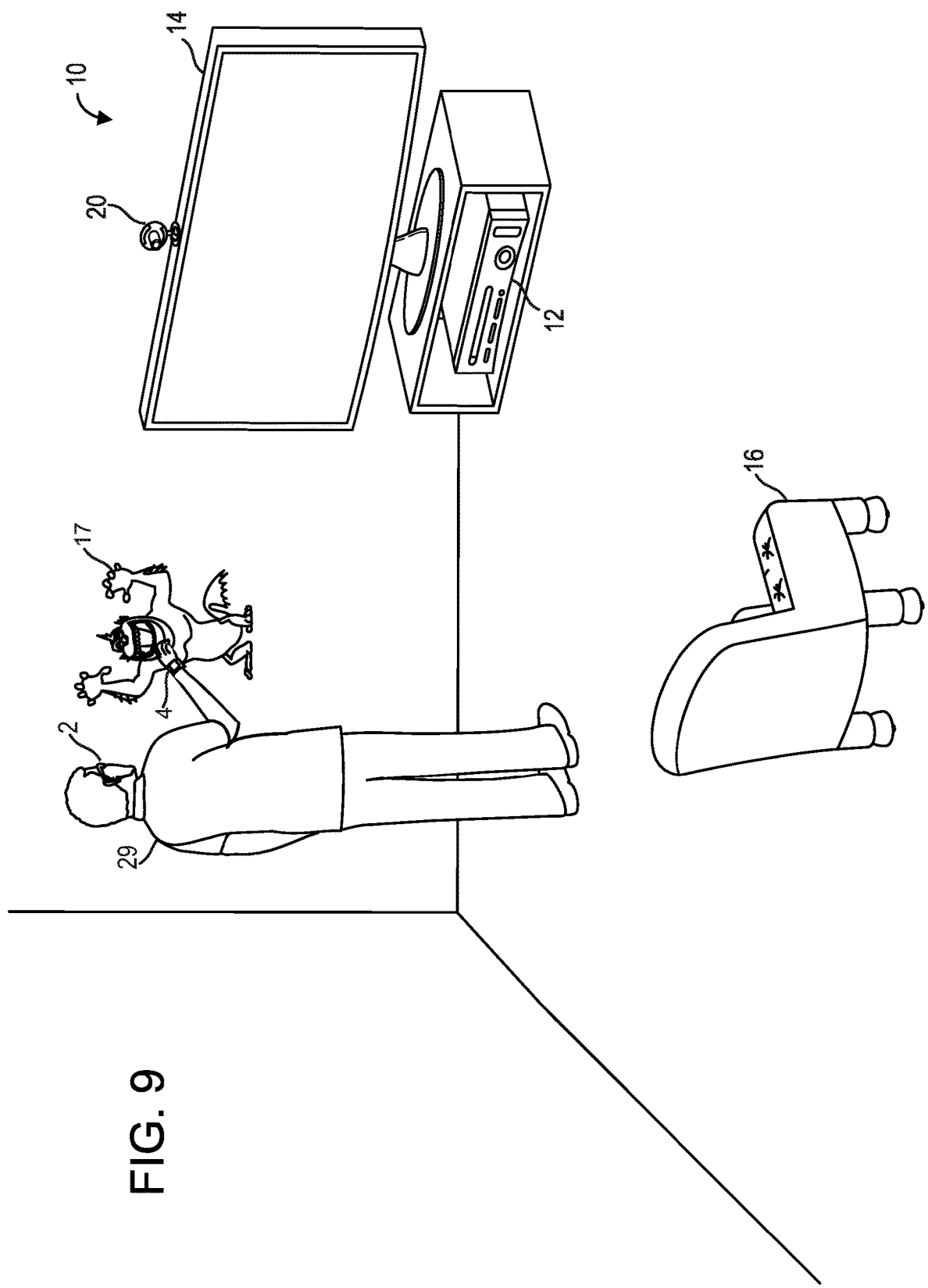
FIG. 9 illustrates an example of providing a game based incentive for a user wearing a near-eye display (NED) system to assist with space carving a user environment.
Figure 10:
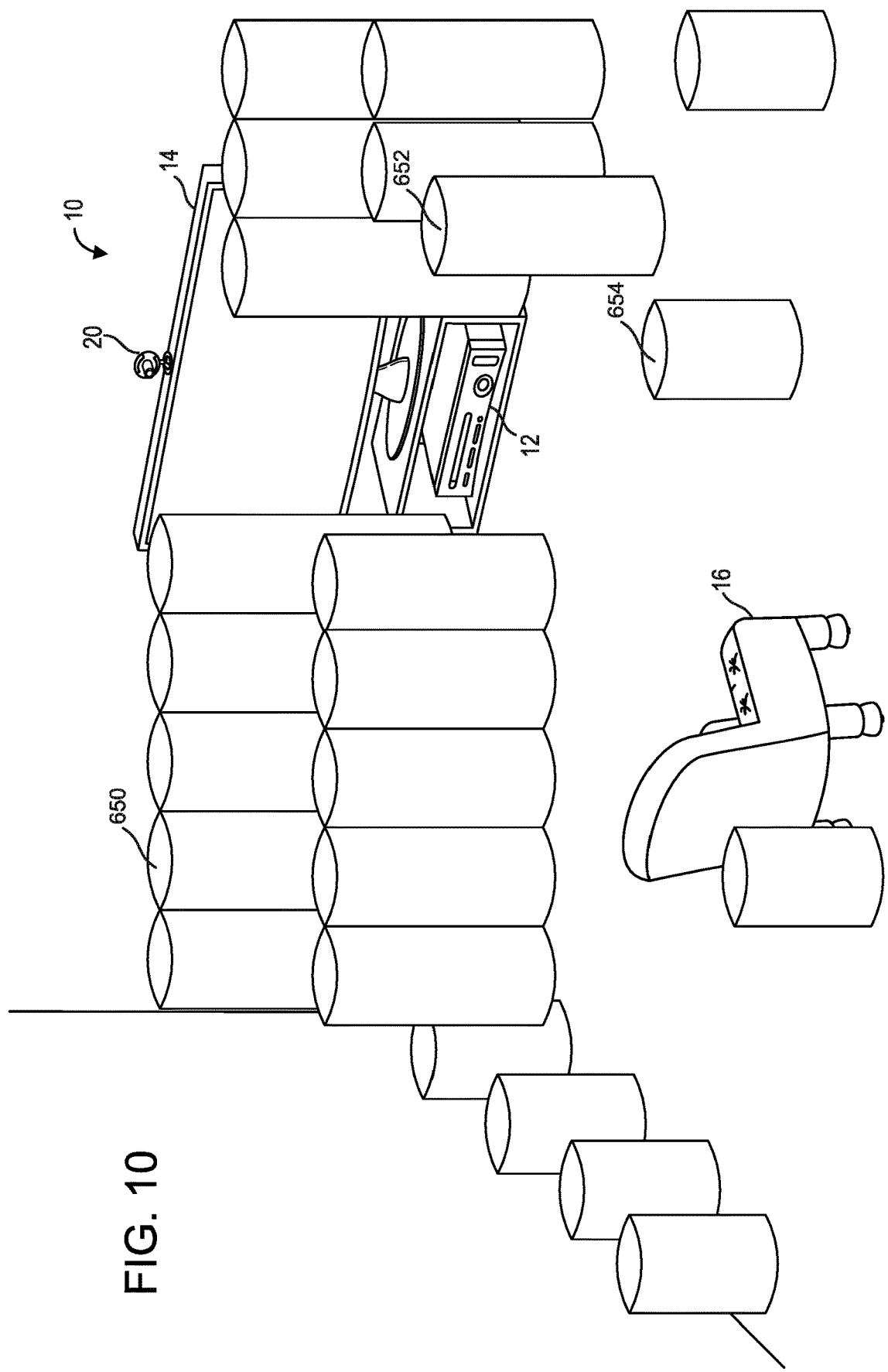
FIG. 10 illustrates an example of a user view of a state of space carving represented by an uncarved space overlay being displayed by the NED system as feedback to the user on carving progress.

In optional step 412, the space carving engine 304 may cause the NED to optionally display a visual representation of the state of space carving in the user environment. This provides user feedback on the carving progress being made. FIGS. 9 and 10 illustrate examples of displaying uncarved space and carved out space to a user respectively. In optional step 414, the space carving engine 304 may interact with one or more applications to optionally provide in step 414 a game based incentive for a user to approach object boundaries in a user environment like a wall for more reliable modeling of the space near the wall.

Figure 5:
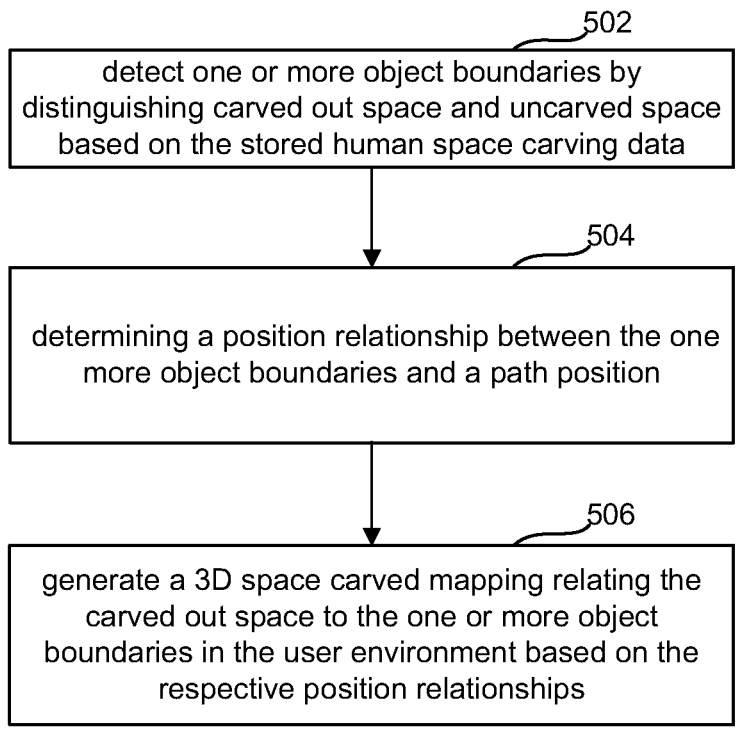
FIG. 5 is a flowchart of an embodiment of a process for generating a 3D space carved mapping of the user environment.

FIG. 5 is a flowchart of an embodiment of a process for generating a 3D space carved mapping of the user environment. In some embodiments, the human space carving data may be stored as bitmap images showing carved and uncarved space at different positions of a navigable path. Particularly, for a well traversed space, over time, the boundaries of uncarved space can be approximated to be object boundaries. In step 502, one or more object boundaries are detected by the one or more processors by distinguishing carved out space and uncarved space identified in the human space carving data. In step 504, a position relationship is determined between the one more object boundaries and a path position. In step 506, based on the respective position relationships for each path position and respective object boundaries determined based on the human space carving data, the one or more processors generate a 3D space carved mapping relating the carved out space to the one or more object boundaries in the user environment.

Figure 6:
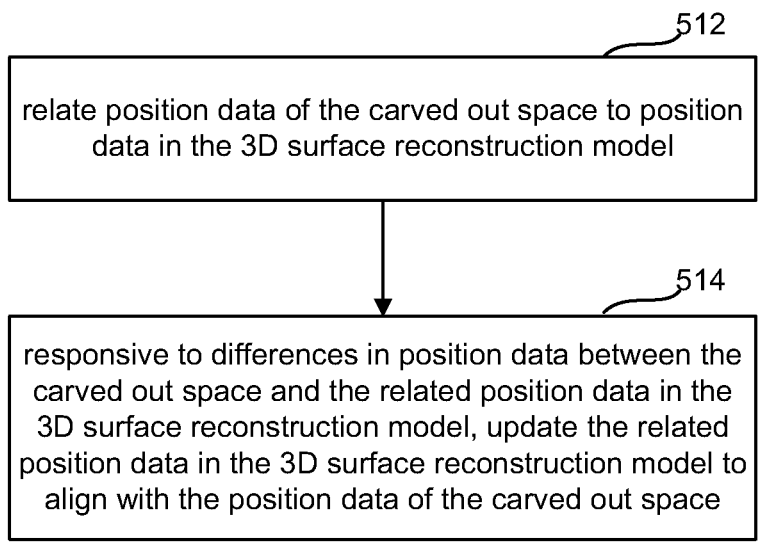
FIG. 6 is a flowchart of an embodiment of a process for updating a 3D surface reconstruction model of the user environment.

FIG. 6 is a flowchart of an embodiment of a process for updating a 3D surface reconstruction model of the user environment. For example, a 3D surface reconstruction module of the scene mapping engine 306 of the NED system 8 may be updating a local copy or an instance of the 3D surface reconstruction model executing in a network accessible computer system 12 communicatively coupled to the NED system 8 may be updating a global copy of the surface reconstruction model of the user environment.

In step 512, position data of the carved out space is related to position data in the 3D surface reconstruction model. In some examples, a NED system may be space carving using a version of a 3D surface reconstruction model as a basis so path positions are being tracked to the 3D model within a short time of image capture. In some examples, Global Positioning System (GPS) data can be used to track the NED system while space carving in an environment. The GPS data can then be used to track carved out areas to the surface model. In other examples, the one or more object boundaries of the 3D space carved mapping can be related to one or more surfaces in the 3D surface reconstruction model based on its shape. Then based on the relationships of the object boundaries to the surfaces, position data of the carved out space can be related to position data in the 3D surface reconstruction model. In step 514, responsive to differences in position data between the carved out space and the related position data in the 3D surface reconstruction model, the related position data in the 3D surface reconstruction model is updated to align with the position data of the carved out space. Even for less complicated 3D mappings like a depth map, space carving can increase reliability. A user approaching an object while wearing the NED system is space carving causes the depth measurements to the object to be verified at the same time.

Before discussing an embodiment of a process for identifying one or more navigable paths in a user environment, some examples are illustrated of using a path position representation having a boundary determined based on a user height and user width. In some examples, a user height and width may be stored in user profile data 197, 322. As for user height, in some examples the 3-axis gyroscope or 3-axis magnetometer of the inertial sensing unit 132 can provide data identifying a distance of the sensor on the NED support to the ground, and thus a user height can be determined from this data. A user width may be inferred in some examples from the user height and other personal data such as gender. For example, a lookup table relating height to width for men and for women may be determined offline based on statistical distributions of the population, and stored in an accessible memory for lookup by the one or more processors. In other examples, the user height and width can be determined from image data of the user. For example, the object recognition engine 192 can detect a user's reflection in a mirror and estimate a user's width and height from the reflection. Some examples of a user width which may be used are a shoulders width or a hip width. In some embodiments, a user depth may be used as well making a 3D volume of the user, and statistical data or image data may be processed by the one or more processors for selecting a depth value. A user depth may be useful if a user is walking or otherwise moving sideways.

Figure 7A:
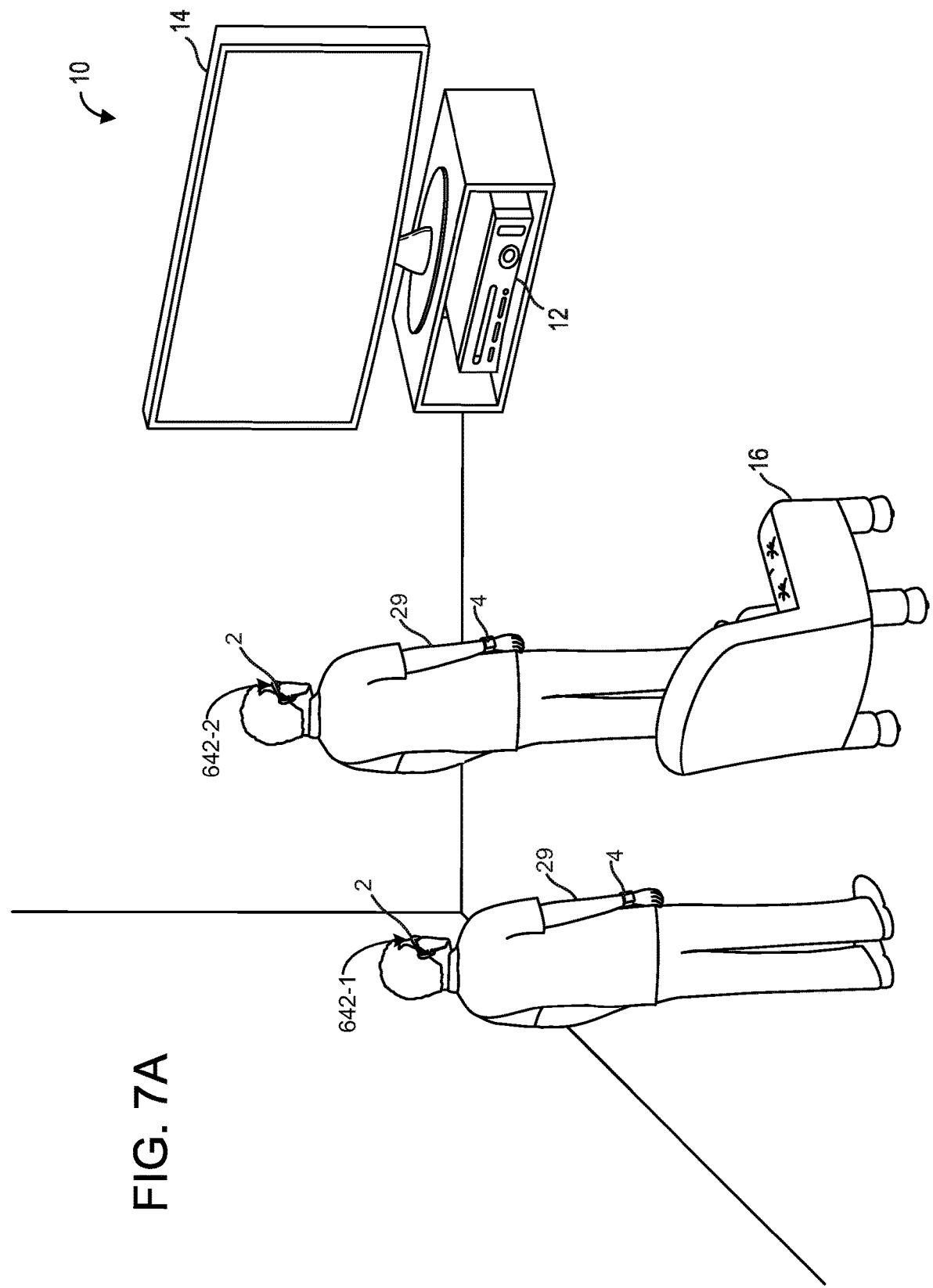
FIGS. 7A and 7B illustrate an example of representing spatial dimensions of a navigable path at a path position as a two dimensional tile having dimensions based on a user height and a user width.
Figure 7B:
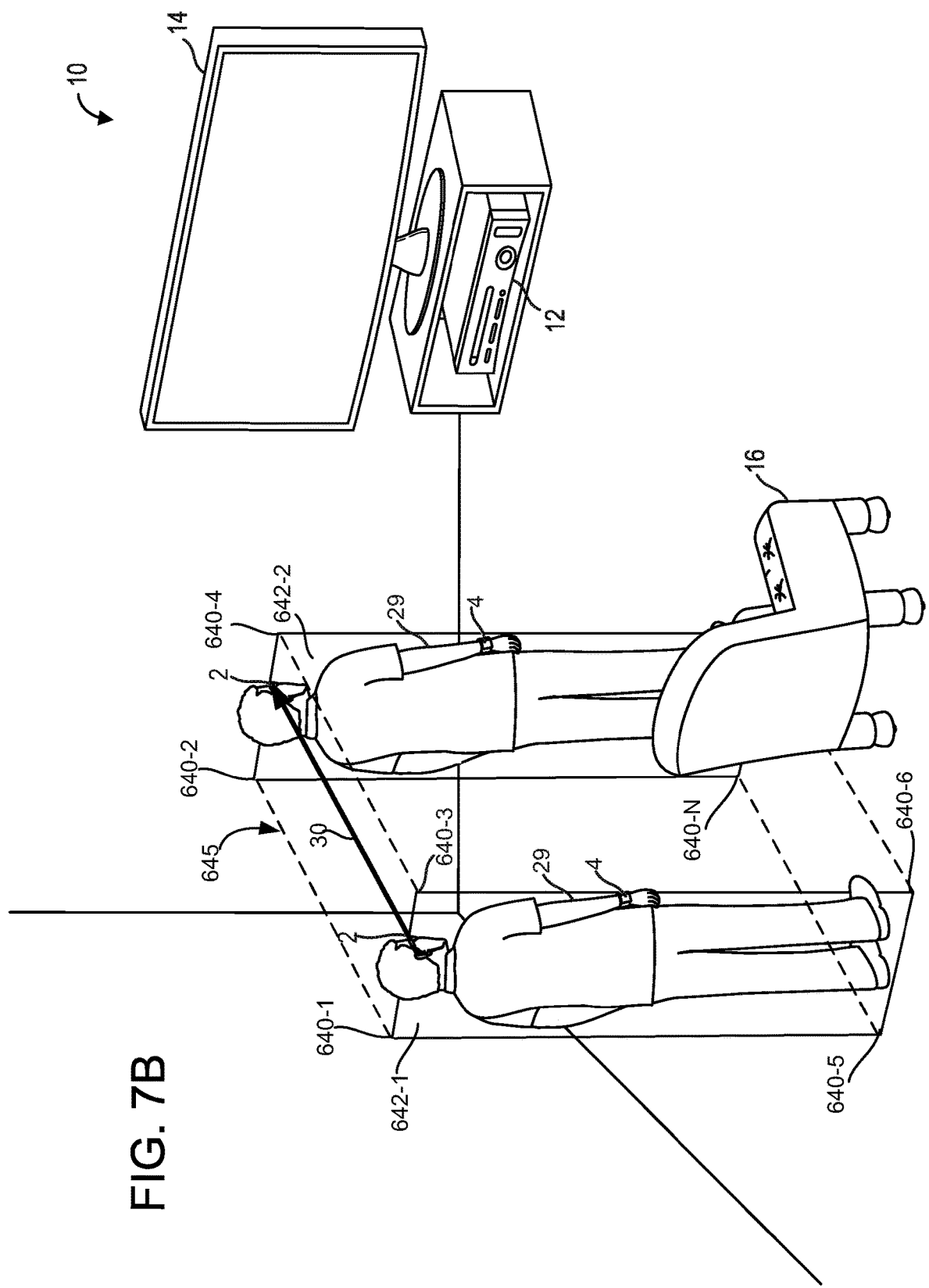
Figure 7C:
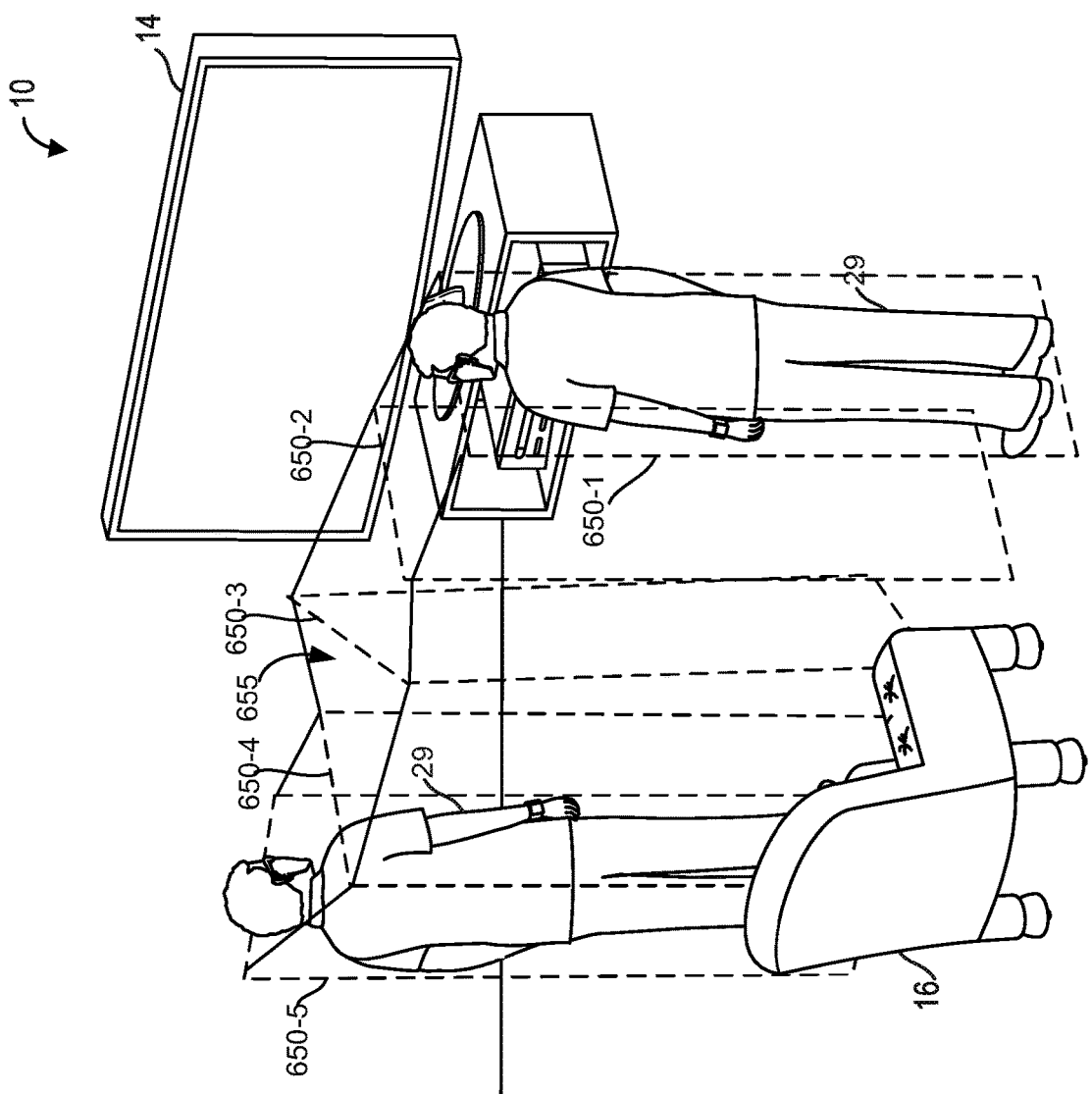
FIG. 7C illustrates another example of representing spatial dimensions of a navigable path including turns.

FIGS. 7A and 7B illustrate an example of representing spatial dimensions of a navigable path at a path position as a two dimensional tile having dimensions based on a user height and a user width. FIG. 7C illustrates another example of representing spatial dimensions of a navigable path including turns.

FIG. 7A illustrates two path positions of a user 29 hereafter referred to as "Joe" for convenience. Joe 29 is wearing his NED device 2 and a wirelessly coupled companion processing module 4 and has taken a few steps in a straight line from path position 642-1 to path position 642-2 towards the audiovisual system 10 in his living room to the left side of chair 16. The audiovisual system 10 includes a television display 14 communicatively coupled to a computer system 12, in this example a gaming console.

FIG. 7B illustrates examples of path position representations 642-1 and 642-2 as rectangular tiles whose dimensions are determined based on a user height and a user width. The user height in this example corresponds to the height of the NED support structure which height in turn depends on the user height when wearing the NED. The width of the rectangular tile is a little bigger than Joe but is sized to cover the width of his shoulders. Position vector 30 represents the distance and direction between the two tiles. The number of path positions tracked may be based on a longer time interval than a time difference between sensor readings. For example, inertial sensing unit data may be read 100 times per second, but the number of path positions may be less than 100.

As Joe walks toward the television, it is as if a real rectangular two dimensional tile of a certain height and width is walking through the living room towards the television. Position data for corresponding points on each tile may be connected for identifying a volume 645 of empty or carved out space in a navigable path. To avoid overcrowding the drawing, just the corners are shown as corresponding points being used to define a 3D navigable path based on Joe's height and width. Upper left corner 640-1 of tile 642-1 is linked or connected to upper left corner 640-2 of tile 642-2. Similarly upper right corner 640-3 of tile 642-2 is linked or connected to upper right corner 640-4 of tile 642-2. Lower left corner 640-5 of tile 642-1 is linked or connected to lower left corner 640-N of tile 642-2. Similarly lower right corner 640-6 of tile 642-1 is linked or connected to an unseen lower right corner of tile 642-2.

FIG. 7C illustrates another example of representing spatial dimensions of a navigable path including turns. In this example, Joe turns are represented by tiles 650-1, 650-2, 650-3, 650-4 and 650-5, reference numerals for the NED devices 2, companion processing modules 4, and corners of the exemplary tiles have been omitted to avoid overcrowding the drawing. In this example, Joe is travelling from the right side of the room at path position location 650-1 across the room and then turns to face the television at path position or location 650-5. In between Joe followed a fairly straight path segment between positions 650-1 and 650-2, and then turned a little to his left as illustrated by tile 650-3 and then a little to his right as indicated by tile 650-4 before turning more to his right to face the television 14 at tile 650-5. As exemplary corresponding points, the upper corners are illustrated as connected with solid lines forming navigable path volume 650-3.

Figure 8:
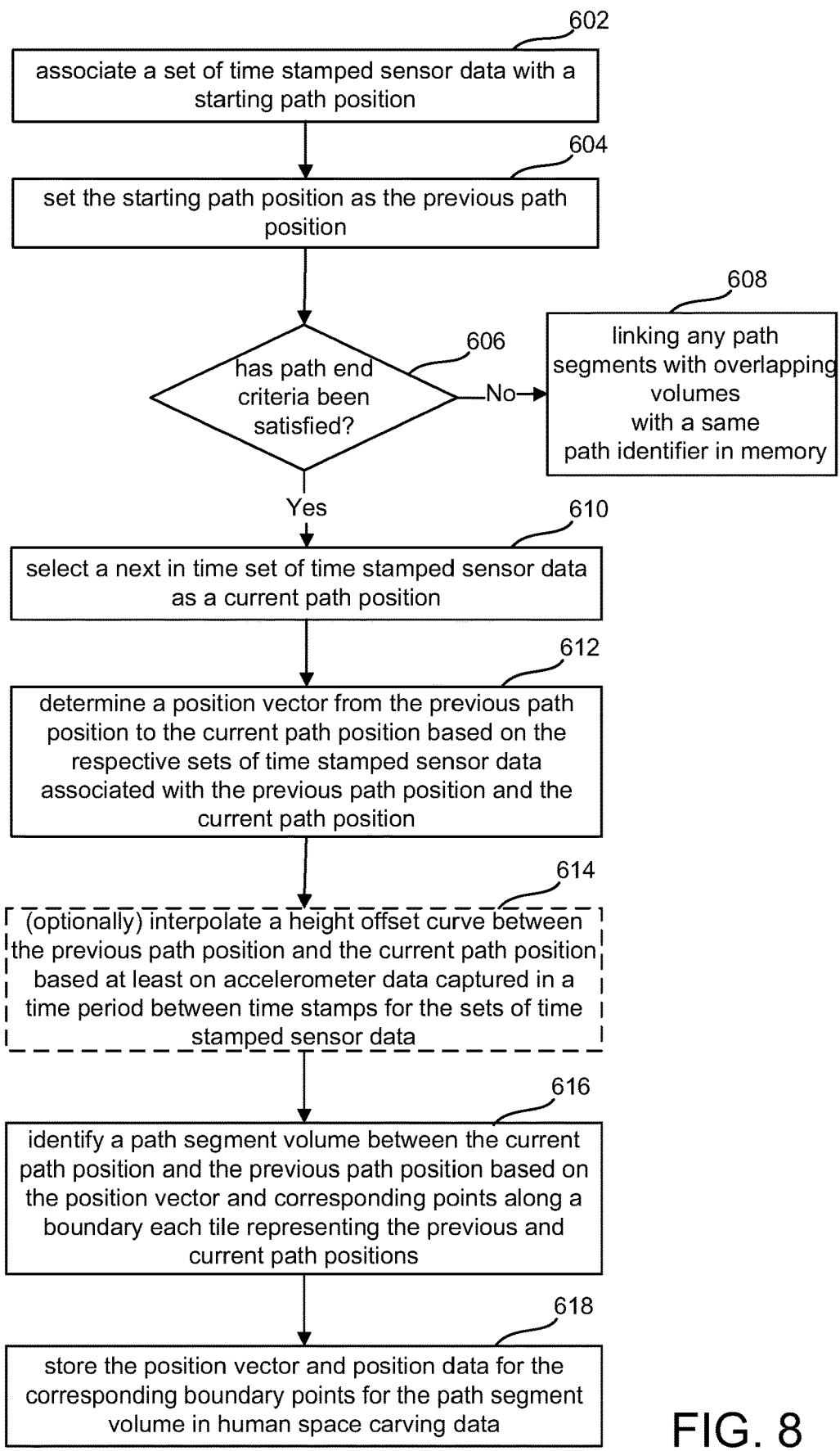
FIG. 8 is a flowchart of an embodiment of a process for identifying one or more navigable paths traversed by one or more users wearing the NED system in a user environment based on user physical features including user height and user body width.

FIG. 8 is a flowchart of an embodiment of a process for identifying one or more navigable paths traversed by one or more users wearing the NED system in a user environment based on user physical features including user height and user body width. This embodiment may be performed during capture or after capturing a set of time stamped sensor data by a NED when being worn by a user. A loop is used as an illustration of iterative steps. In step 602, a set of time stamped sensor data is associated with a starting path position. In step 604, the starting path position is set as the previous path position.

In step 606, the one or more processors identify whether path end criteria has been satisfied. An example of path end criteria is a user input indicating to stop space carving, the device has stopped moving for a time period satisfying the path end criteria, or no more uncarved space can be identified in the user environment during a current session. If the path end criteria is satisfied, then in step 608, any identified path segments with overlapping volumes are linked with a same path identifier in memory.

If the path end criteria is not satisfied, then in step 610, a next in time set of time stamped sensor data is selected as a current path position. In step 612, a position vector from the previous path position to the current path position is determined based on the respective sets of time stamped sensor data associated with the previous path position and the current path position. In some examples, the position vector can be determined based on GPS data generated by the location unit 144. In other examples, the inertial sensing unit 132, having the starting path position, e.g. from a GPS unit or from an existing mapping, may be an inertial navigation system and can provide time stamped position and velocity data from which a position vector for the path segment from the previous path position to the current path position can be identified.

In other examples, accelerometer data captured for the path segment can indicate a direction of movement from the previous path position to the current path position as well as speed and acceleration. A user stride length may be used to determine the distance travelled based on the speed or acceleration data. For example, accelerometer data can have been previously tracked for the user and a user stride length stored for the user in user profile data 197, 322 or uploaded to the 3D mapping library. For more information on determining stride length from accelerometer data, see US published patent application US20090043531 to Kahn et al., which is hereby incorporated by reference.

Optionally, in step 614, a height offset curve is interpolated between the previous path position and the current path position based on at least accelerometer data captured in a time period between time stamps for the sets of time stamped sensor data for the previous path position and the current path position. Accelerometer data can indicate changes in head height which can indicate a change in terrain or climbing stairs.

In step 616, a path segment volume between the current path position and the previous path position is identified based on the position vector and corresponding points along a boundary of each tile representing the previous and current path positions. In step 618, the position vector and position data for the corresponding boundary points are stored for the path segment volume in human space carving data.

FIG. 9 illustrates an example of providing a game based incentive for a user wearing a near-eye display (NED) system to assist with space carving a user environment. In this example, Joe is playing a game which assists with space carving. The game displays a monster character 17 on surfaces identified in a 3D surface reconstruction mesh of the user environment which a 3D surface reconstruction module 302 seeks verification of its position data in the user environment. The game provides Joe 29 a game incentive, like scoring points or obtaining game points which can purchase items on a game service, for every monster he touches. The monster 17 is displayed to appear or disappear on the wall. The dimensions of Joe's arm are stored in an accessible memory like user profile data. The arm dimensions may have been calculated dynamically based on data captured using a forward-facing image or depth sensor. The arm dimension may be assigned based on the statistical data for his height and gender. Additionally, the arm length may have been measured from image data of Joe.

FIG. 10 illustrates an example of a user view of an uncarved space overlay being displayed by the NED system as feedback to the user on carving progress. In this example, a user wearing the NED system is viewing the living room through the near-eye display. An overlay of cylinders of different heights is displayed. Just one cylinder of different height is labeled to avoid overcrowding the drawing. The uncarved space overlay is displayed so that cylinders (or other object displayed like grass or flowers, wheat, etc.) for a designated portion of a field of view of the NED appear below a height criteria even when space in the designated portion of the field of view is uncarved. The height criteria varies based on the viewer's height. This is to prevent a claustrophobic feeling for the user. In this example, there are two designated portions of the field of view in which cylinder height is reduced: a near field of view and a middle field of view where near and middle are defined based on depth into the display field of view of the NED. Cylinders 654 in the near field of view are about half the size of cylinders 652 in the middle field of view. In the far field of view, tall cylinders 650 are displayed. The variation in height and placement provides a comfortable viewing experience within human factors tolerances on the focal plane of the display. Showing objects too near the user causes fatigue and comfort issues due to the mismatch between the focus (light) and the horizontal separation (3D depth cue).

FIG. 11 illustrates an example of a user view of a carved out space overlay 700 being displayed by the NED system as feedback to the user on carving progress. As a user walks or runs on the floor or ground in space carving, a floor based overlay can show a walkable heat map of carved out space and not have a claustrophobic feel. Overlay 700 shows the carved out space in Joe's living room.

Figure 12:
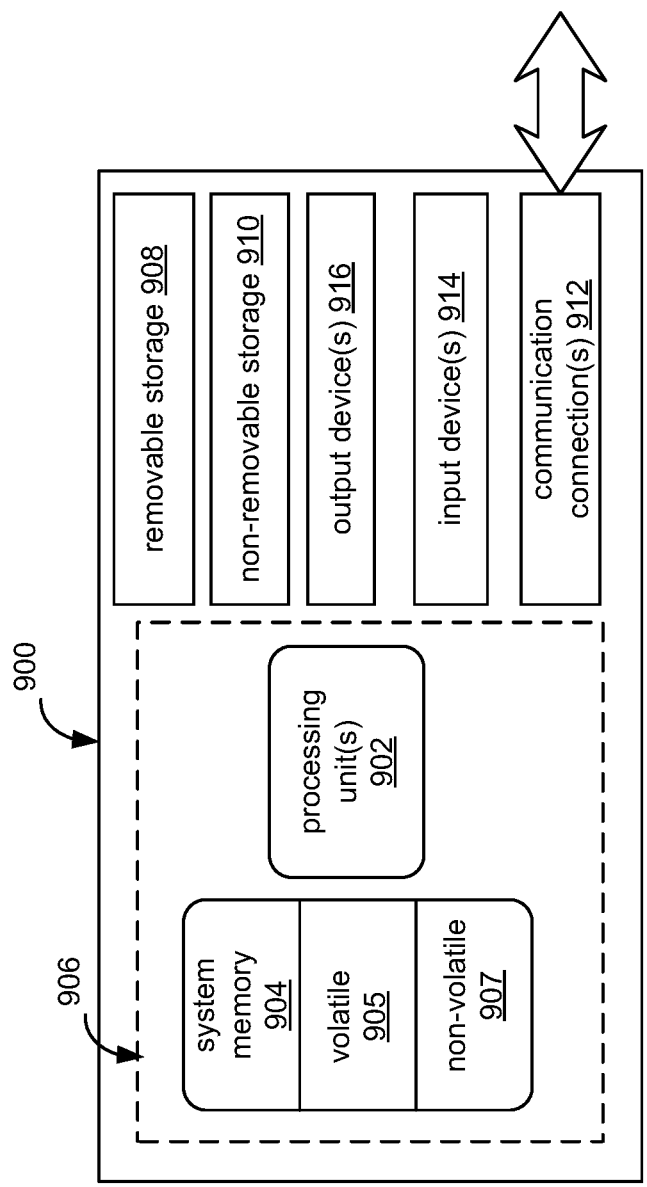
FIG. 12 is a block diagram of one embodiment of a computing system that can be used to implement a network accessible computing system, a companion processing module or control circuitry of a near-eye display device.

FIG. 12 is a block diagram of one embodiment of a computing system that can be used to implement a network accessible computing system 12, a companion processing module 4 or control circuitry 136 of a near-eye display device. FIG. 12 is a block diagram of one embodiment of a computer system that can be used to implement a network accessible computing system 12, a companion processing module 4, or another embodiment of control circuitry 136 of a near-eye display (NED) device which may host at least some of the software components of computing environment 54. The complexity and number of components may vary considerably for different embodiments of the computer system 12, the control circuitry 136 and the companion processing module 4. FIG. 12 illustrates an exemplary computer system 900. In its most basic configuration, computing system 900 typically includes one or more processing units 902 including one or more central processing units (CPU) and one or more graphics processing units (GPU). Computer system 900 also includes memory 904. Depending on the exact configuration and type of computer system, memory 904 may include volatile memory 905 (such as RAM), non-volatile memory 907 (such as ROM, flash memory, etc.) or some combination of the two. This most basic configuration is illustrated in FIG. 9 by dashed line 906. Additionally, computer system 900 may also have additional features/functionality. For example, computer system 900 may also include additional storage (removable and/or non-removable) including, but not limited to, magnetic or optical disks or tape. Such additional storage is illustrated in FIG. 12 by removable storage 908 and non-removable storage 910.

Computer system 900 may also contain communication module(s) 912 including one or more network interfaces and transceivers that allow the device to communicate with other computer systems. Computer system 900 may also have input device(s) 914 such as keyboard, mouse, pen, voice input device, touch input device, etc. Output device(s) 916 such as a display, speakers, printer, etc. may also be included.

The example computer systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for three dimensional (3D) space carving of a user environment, comprising:
    identifying, by one or more processors of a near-eye display (NED) system, one or more user navigable paths respectively traversed by a NED of the NED system in the user environment based on sensor data from a position indicating sensor of the NED system;
    generating, by the one or more processors, position and spatial dimensions of the one or more user navigable paths based on overlapping portions of the one or more user navigable paths;
    identifying, by the one or more processors, carved out space of the user environment based on the position and spatial dimensions;
    determining, by the one or more processors, an object boundary based on the carved out space of the user environment;
    determining a position relationship between the carved out space and the object boundary based on a path position indicated by the position and spatial dimensions of the one or more user navigable paths; and
    generating, by the one or more processors, a 3D space carved mapping of the user environment based on the position relationship between the carved out space and the object boundary.

2. The method of claim 1, further comprising:
    storing the position and spatial dimensions of the one or more user navigable paths.

3. The method of claim 1, further comprising:
    updating a 3D surface reconstruction model of the user environment based on the 3D space carved mapping of the user environment.

4. The method of claim 3, further comprising:
    updating position data of the 3D surface reconstruction model to align with position data of the carved out space.

5. The method of claim 4, further comprising:
    relating the position data of the carved out space to the position data in the 3D surface reconstruction model;
    wherein the updating of the position data of the 3D surface reconstruction model is in response to differences of the position data of the carved out space and the position data of the 3D surface reconstruction model.

6. The method of claim 1, wherein the identifying of the one or more user navigable paths based on the sensor data comprises:
    representing the position and spatial dimensions of the carved out space portion of the one or more user navigable paths based on at least one of height data or width data corresponding to a user of the NED.

7. A near-eye display (NED) system for three dimensional (3D) space carving of a user environment, comprising:
    a near-eye support structure;
    a NED supported by the near-eye support structure and having a field of view approximating a user field of view;
    a position indicating sensor supported by the near-eye support structure; and
    one or more processors communicatively coupled with the position indicating sensor, the one or more processors configured to:
        identify one or more user navigable paths respectively traversed by the NED in the user environment based on sensor data from the position indicating sensor;
        generate position and spatial dimensions of the one or more user navigable paths based on overlapping portions of the one or more user navigable paths;
        identify carved out space of the user environment based on the position and spatial dimensions;
        determine an object boundary based on the carved out space of the user environment;
        determine a position relationship between the carved out space and the object boundary based on a path position indicated by the position and spatial dimensions of the one or more user navigable paths; and
        generate a 3D space carved mapping of the user environment based on the position relationship between the carved out space and the object boundary.

8. The NED system of claim 7, wherein the one or more processors are further configured to:
    store the position and spatial dimensions of the one or more user navigable paths.

9. The NED system of claim 7, wherein the one or more processors are further configured to:
    update a 3D surface reconstruction model of the user environment based on the 3D space carved mapping of the user environment.

10. The NED system of claim 9, wherein the one or more processors are further configured to:
    update position data of the 3D surface reconstruction model to align with position data of the carved out space.

11. The NED system of claim 10, wherein the one or more processors are further configured to:
    relate the position data of the carved out space to the position data in the 3D surface reconstruction model,
    wherein the position data of the 3D surface reconstruction model is updated in response to differences of the position data of the carved out space and the position data of the 3D surface reconstruction model.

12. The NED system of claim 7, wherein the one or more processors are further configured to:
    represent the position and spatial dimensions of the carved out space portion of the one or more user navigable paths based on at least one of height data or width data corresponding to a user of the NED.

13. A computer-readable device storing computer executable code for a near-eye display (NED) system for three dimensional (3D) space carving of a user environment, comprising code to:
    identify one or more user navigable paths respectively traversed by a NED of the NED system in the user environment based on sensor data from a position indicating sensor of the NED system;
    generate position and spatial dimensions of the one or more user navigable paths based on overlapping portions of the one or more user navigable paths;
    identify carved out space of the user environment based on the position and spatial dimensions;

determine an object boundary based on the carved out space of the user environment;

determine a position relationship between the carved out space and the object boundary based on a path position indicated by the position and spatial dimensions of the one or more user navigable paths; and generate a 3D space carved mapping of the user environment based on the position relationship between the carved out space and the object boundary.

14. The computer-readable device of claim 13, further comprising code to:

store the position and spatial dimensions of the one or more user navigable paths.

15. The computer-readable device of claim 13, further comprising code to:

update a 3D surface reconstruction model of the user environment based on the 3D space carved mapping of the user environment.

16. The computer-readable device of claim 15, further comprising code to:

updating position data of the 3D surface reconstruction model to align with position data of the carved out space.

17. The computer-readable device of claim 16, further comprising code to:

relate the position data of the carved out space to the position data in the 3D surface reconstruction model, wherein the position data of the 3D surface reconstruction model is updated in response to differences of the position data of the carved out space and the position data of the 3D surface reconstruction model.

* * * * *